June 30, 1964   J. S. ROBBINS   3,139,148
ROTARY BORING HEAD HAVING ROLLER CUTTER DISKS
Original Filed April 17, 1959   4 Sheets-Sheet 2
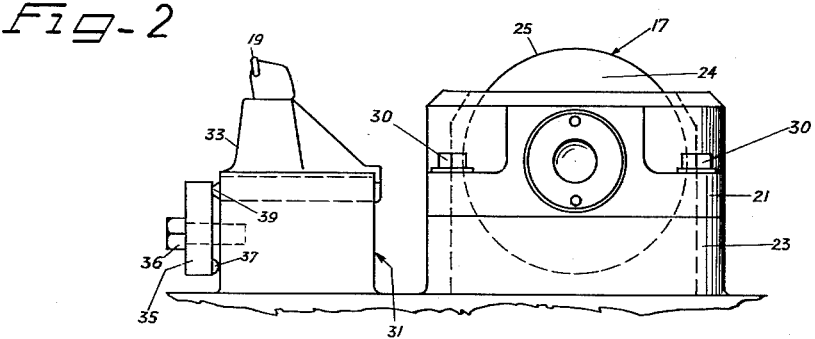
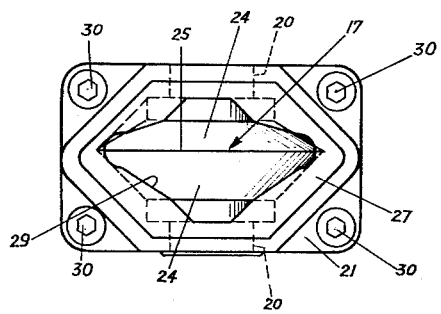
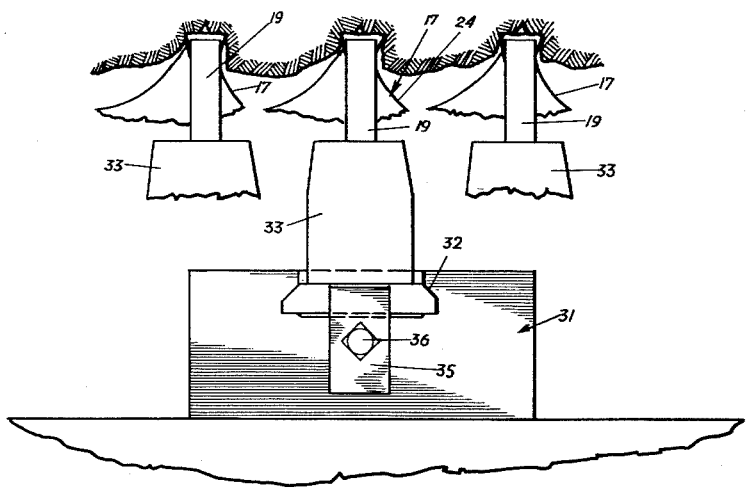
INVENTOR.
James S. Robbins, deceased
By William W. Miller, executor
BY
ATTORNEYS

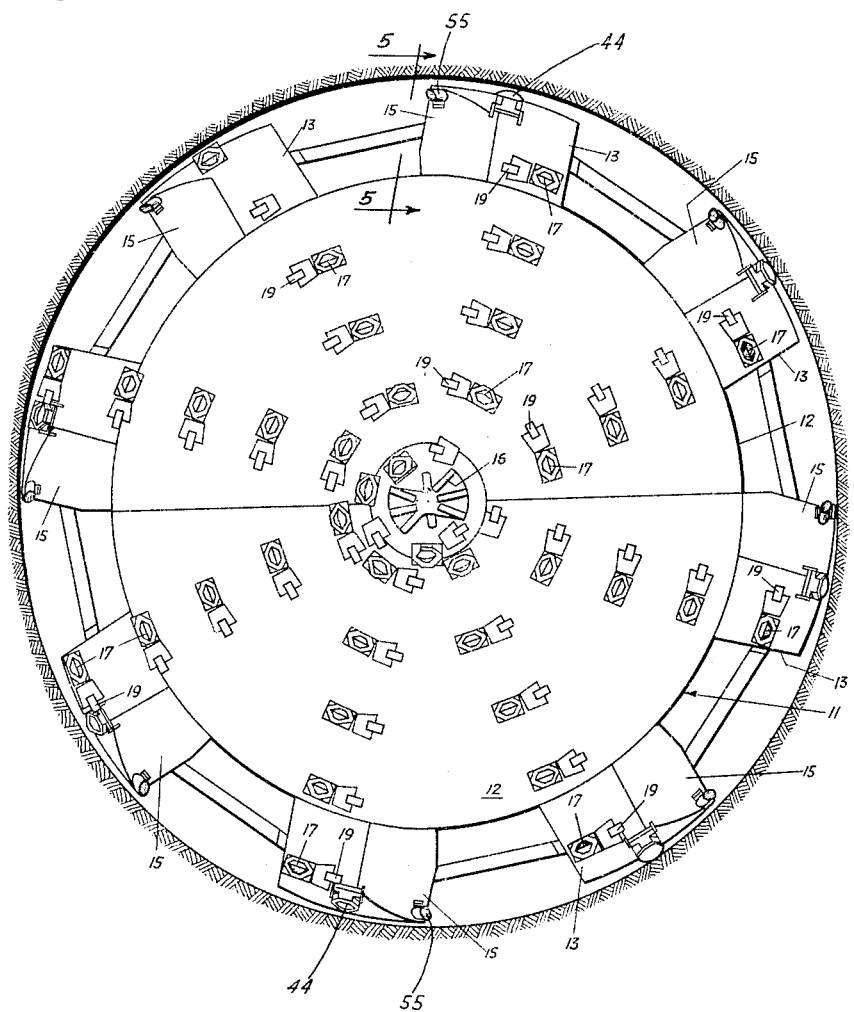

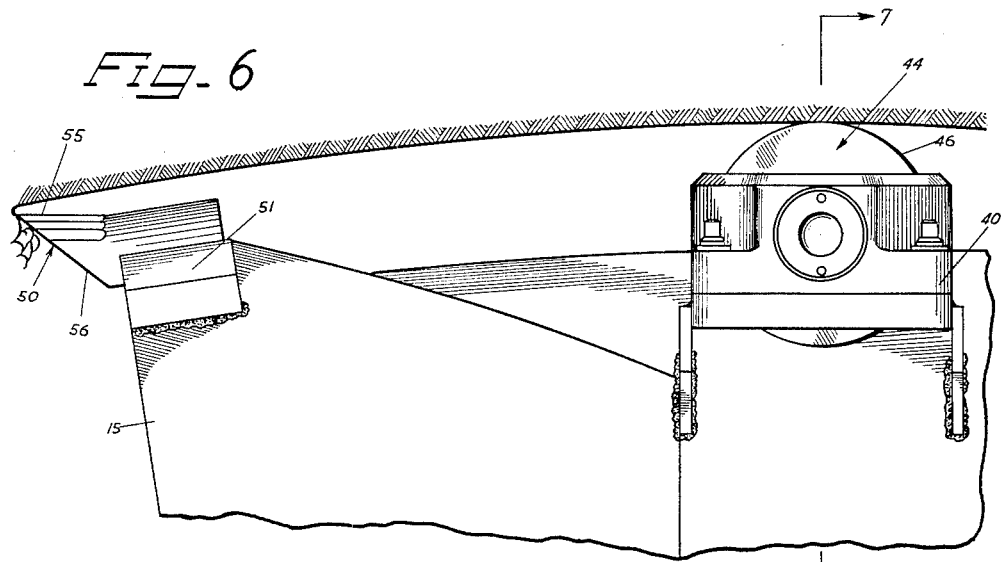
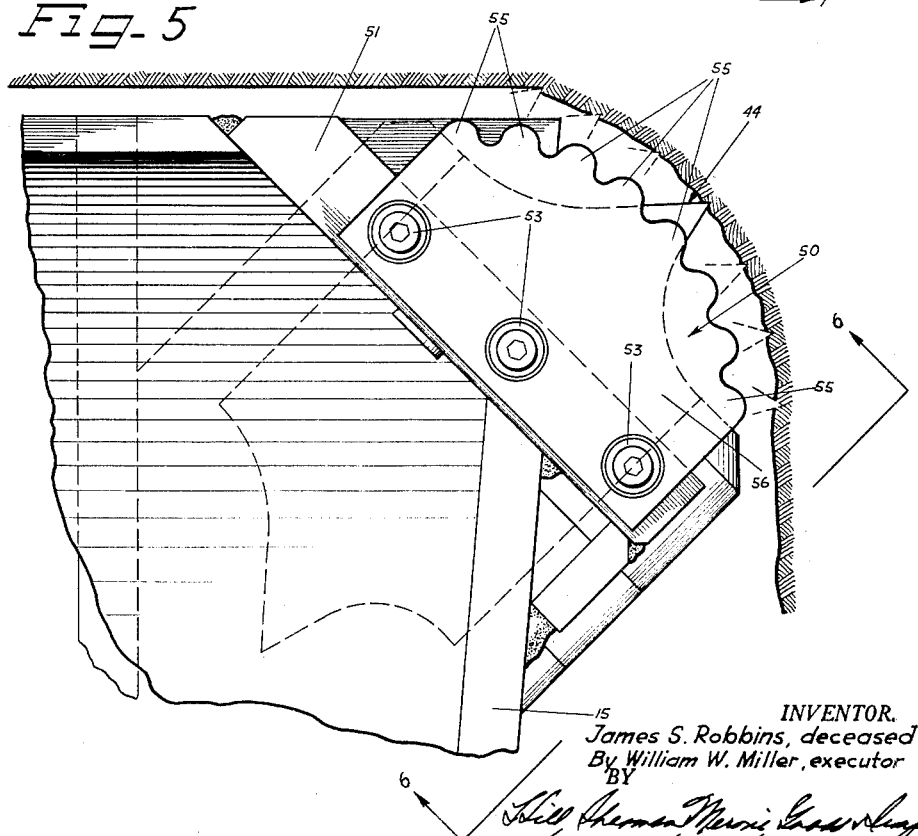

June 30, 1964 J. S. ROBBINS 3,139,148
ROTARY BORING HEAD HAVING ROLLER CUTTER DISKS
Original Filed April 17, 1959 4 Sheets-Sheet 4

INVENTOR.
James S. Robbins, deceased
By William W. Miller, executor
BY
ATTORNEYS

United States Patent Office 3,139,148
Patented June 30, 1964

3,139,148
ROTARY BORING HEAD HAVING ROLLER CUTTER DISKS
James S. Robbins, deceased, late of Seattle, Wash., by William W. Miller, executor, Northfield, Ill., assignor to Goodman Manufacturing Company, a corporation of Illinois
Original applications Apr. 17, 1959, Ser. No. 816,353, now Patent No. 3,061,287, dated Oct. 30, 1962, and June 15, 1959, Ser. No. 820,200, now Patent No. 3,061,288, dated Oct. 30, 1962. Divided and this application Mar. 26, 1962, Ser. No. 183,692
11 Claims. (Cl. 175—336)

This invention relates to improvements in boring heads for tunneling machines of the rotary boring head type and more particularly relates to the cutter devices for such machines.

This application is a division of applications Serial Nos. 816,353 filed April 17, 1959 and 820,200 filed June 15, 1959, by William W. Miller as executor of the Estate of James S. Robbins, deceased, and entitled "Rotary Head Tunneling Machine" and now Patents Numbers 3,061,287 and 3,061,288 respectively.

A principal object of the invention is to provide an improved form of rotary boring head and cutter devices therefore, arranged with a view toward increasing the speed and efficiency of boring.

Another object of the invention is to provide an improved form of rotary boring head utilizing a series of rolling cutters spaced circumferentially and radially from the center of the boring head, in which the efficiency of cutting is improved by leading the rolling cutters with cutter bits spaced axially inwardly of the cutting faces of the rolling cutters.

A still further object of the invention is to provide an improved form of boring head for rotary boring machines and the like utilizing disc-like rolling cutters so arranged as to cut a rounded corner at the periphery of the tunnel bore, and by providing scraper bits in advance of the rolling cutters and arranged to conform to the rounded corner cut thereby and pitched at less than the cutting depth of the rolling cutters to maintain clear paths for the rolling cutters.

A still further object of the invention is to provide an improved form of boring head for rotary boring machines and the like utilizing disc-like rolling cutters so arranged as to cut a rounded corner at the periphery of the tunnel bore, and by providing scraper bits in advance of the rolling cutters and arranged to conform to the rounded corner cut thereby and pitched at less than the cutting depth of the rolling cutters to maintain clear paths for the rolling cutters.

Still another object of the invention is to provide a rotary boring head for tunneling machines and the like in the form of a plate rotatable about a horizontal axis in which a plurality of advance cutter bits and rearwardly spaced rolling cutters pitched to cut at greater cutting depths than the cutter bits, project forwardly from the plate and are arranged in a continuous spiral leading from the center to the periphery of the plate.

These and other objects of the invention will appear from time to time as the following specification proceeds and with reference to the accompanying drawings wherein:

FIGURE 1 is a front end view of a rotary boring head constructed in accordance with the principles of the invention;

FIGURE 2 is a partial fragmentary sectional view illustrating the arrangement of leading bit and trailing roller in side elevation;

FIGURE 3 is a detail plan view of the support mounting for a rolling cutter;

FIGURE 4 is a fragmentary end view of the rotary boring head shown in FIGURE 1 illustrating the cutting pattern of the roller cutter discs, showing the scraper cutter bits in advance of the roller cutter discs and set at less than cutting gauge of the cutter bits;

FIGURE 5 is a fragmentary end view taken substantially along line 5—5 of FIGURE 1, and illustrating the scraper bit and peripheral cutter for cutting a round corner at the periphery of the tunnel face;

Figure 7:
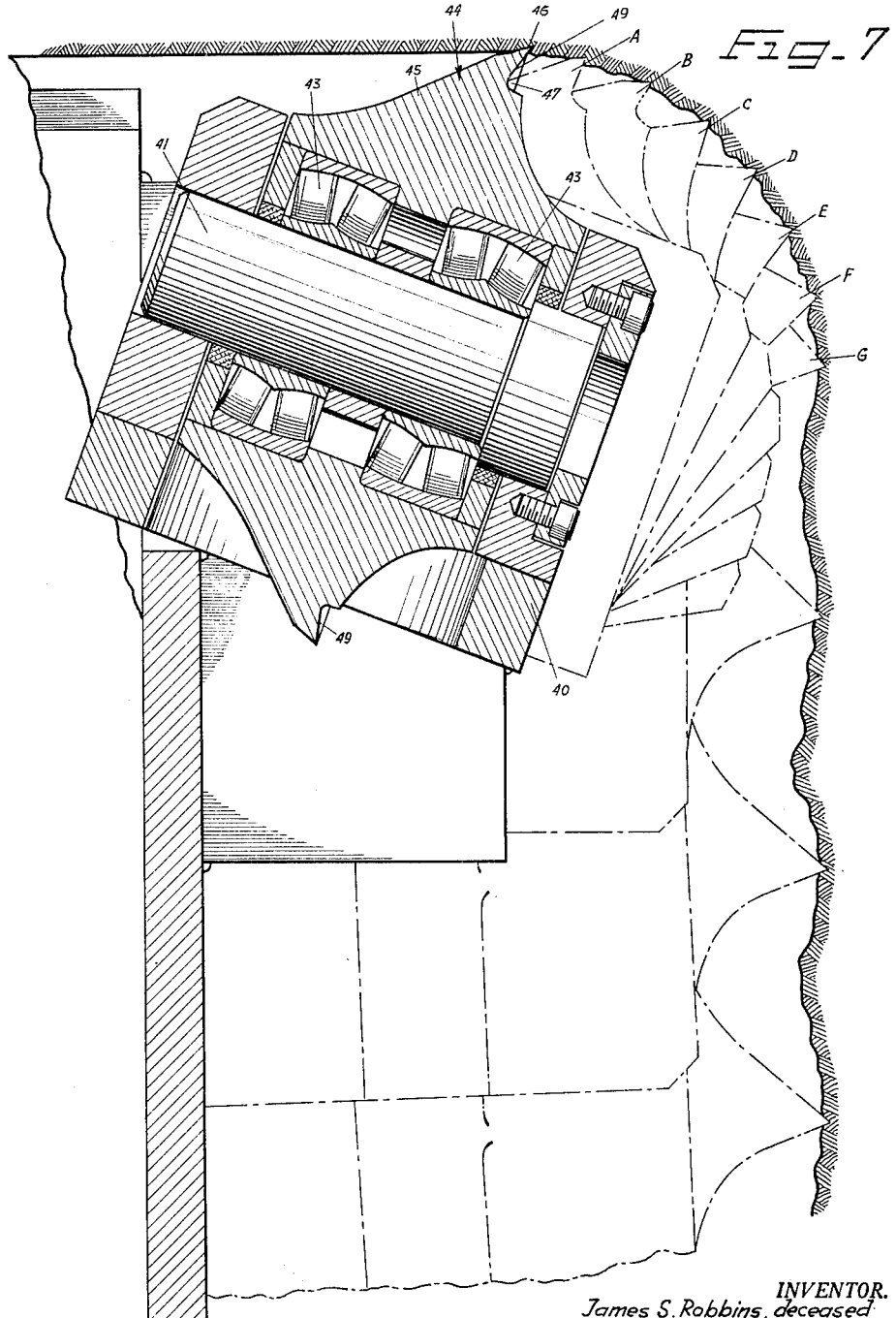

FIGURE 6 is a fragmentary view in side elevation of a peripheral scraper bit and roller cutter disc looking substantially along line 6—6 of FIGURE 2; and FIGURE 7 is a vertical sectional view taken through one of the peripheral cutters substantially along line 7—7 of FIGURE 6 and illustrating the mounting of a peripheral rolling cutter and the cutting pattern of the peripheral cutters for cutting a rounded corner at the periphery of the tunnel face.

In the embodiment of the invention illustrated in the drawings, FIGURE 1 shows a rotary cutter or boring head 11 of a rotary tunneling machine for continuously effecting a tunnel boring operation during rotation thereof. The rotary boring head 11 may be rotatably mounted at the front end of an elongated main frame (not shown) commonly called a jumbo, and may be advanced into the working face of the tunnel by feeding movement of the jumbo along the tunnel as shown and described in applications Serial Nos. 816,353 and 820,200 of which this application is a division.

The boring head 11, as shown in FIGURE 1, comprises a central disc or plate 12 having circumferentially spaced boring or cutter arms 13 extending radially therefrom, with material carrying buckets 15 carried by said cutter arms and opening in the direction of rotation of the boring head to pick up the mined material from the ground and the tunnel face, during rotation and advance feeding movement of the boring head into the working face of the tunnel. The buckets 15 are arranged to discharge the mined material onto the conveyor of the machine (not shown) to be carried away thereby as in application Serial No. 820,200, previously referred to.

The plate or disc 12 is shown in FIGURE 1 as having a pilot cutter 16 at the center thereof and as having a series of trailing roller cutter discs 17 led by leading cutter bits 19 and arranged in a spiral pattern from the pilot cutter 16 to the periphery of the plate 12 and continuing along the boring arms 13.

Each roller cutter disc 19 is mounted for free rotation on a shaft 20 supported at its opposite ends in a support 21 mounted on a hollow block 23. Each roller cutter disc has a pair of opposed frusto-conical side faces 24 forming at their juncture a generally circular, or wedge shaped periphery defining a cutting edge 25.

The hollow block 23 may be welded or otherwise secured to the front face of the plate 12. The supports 21 are shown as being formed integrally with a sheath 27 sheathing the associated roller 17. The sheath 27 has an outwardly opening receptacle 29 for the roller 17, protecting a greater part of the surface area of the roller and accommodating only a small part of the cutting surface of the roller to project from the sheath. The sheath 17 and bearing support 21 besides containing and protecting the rollers, also cooperates with the leading bits 19 to clear loose material from the rollers and to thereby increase the cutting efficiency thereof. The sheath 27 and integrally formed support 21 are mounted on the hollow block 23 as by cap or machine screws 30.

Mounted on the forward face of the plate 12 in advance of each sheath 27 and bearing support 21 is a bit holder 31. The bit holder 31 has a forwardly opening V-shaped bit block receiving recess 32 therein converging from the advance or forward end of the bit holder to the rear end thereof and generally dove tail in front elevation. The bit block receiving recess 32 is adapted to receive a bit carrying block 33 having a cutter bit 19 carried therein and projecting outwardly therefrom. The cutter bits 19 are shown in FIGURE 4 as being chisel point bits, set at less than the cutting gauge of the roller cutter discs 17 therebehind, for maintaining a clear path in front of the trailing roller cutter discs 17.

The force of cutting will normally maintain the bit carrying blocks 33 in the dove tail V-shaped block receiving recesses 32. Clamping plates 35, however, are shown in FIGURE 2 as being secured to the advance faces of the bit holders 31 and as being secured thereto as by cap or machine screws 36. The clamping plates 35 each have a horizontal ridge 37 engaging the advance face of the bit holder 31 on one side of the cap screw 36 and engaging a vertically spaced ridge 39 extending from the advance face of the bit carrying block 33. The clamping plates 35 serve to hold the bit carrying blocks 33 in position in cases where the direction of rotation of the boring head 11 may be reversed to free the boring head.

The roller cutter discs 17 and leading cutter bits 19 are thus mounted on the front face of the plate 12 of the boring head 11 in the form of a spiral to cut a series of non-tracking grooves in the tunnel face from the center to the periphery of the boring head, the scraper bits 19 maintaining clear paths for the roller cutter discs 17, to accommodate cutting by said roller cutter discs without binding. The cutter or scraper bits 19 also serve to cut hard inclusions in the working face in advance of the associated trailing roller cutter discs.

At the outer edge of each arm 13 adjacent the bucket 15, is a roller support 40 (FIGURES 6 and 7). Each roller support 40 is arranged to support a roller support shaft 41 at an angle with respect to the horizontal, and shown in FIGURE 7 as being tilted forwardly and downwardly toward the axis of rotation of the boring head. The shaft 41 is shown as having roller bearings 43 mounted thereon, forming a bearing mounting for a roller cutter disc 44. Each roller cutter disc 44 is generally frusto conical in cross-section and has an inclined retreating face 45 leading to a cutting tip 46 at periphery of the disc. The advance faces of the roller cutter discs 44 are shown as terminating at their outer end portions into generally arcuate recesses 47 leading to a slightly forwardly pitched face 49, cooperating with the face 45 to define the cutting tip or periphery 46 of the roller cutter disc.

Each roller cutter disc 44 rotates about an inclined axis, inclined at a different angle from the next preceding roller cutter disc. As shown in FIGURE 7, the advance roller cutter disc 44 is inclined to cut adjacent the periphery of the bore, while the succeeding roller cutter discs 44 designated by reference characters A, B, C, D, E, F and G are inclined at steeper angles than the angle of inclination of the advance roller cutter disc, positioning the cutting tips 46 thereof to split the rock or other material being cut at the corner at the periphery of the tunnel face, and to thereby avoid the necessity of scraping or machining the rock at the corner, as has heretofore been necessary with fixed cutters.

In advance of each roller cutter disc 44 is a scraper bit 50. Each scraper bit 50 is shown in FIGURES 5 and 6 as being mounted on a bit holder 51, and as being fan shaped in front elevation. The bit holder 51 is shown in FIGURES 1 and 6 as being mounted on an advance outer edge of a bucket 15 and as extending in advance of the bucket to advance and deflect the loose material mined into the associated bucket. The scraper bits 50 are retained to their respective bit holders as by cap or machine screws 53. Each scraper bit 50 has a plurality of lobes 55, an upper outer lobe 55 corresponding to the upper outer peripheral roller cutter disc 44 shown in FIGURE 7 and the other lobes corresponding to the cutting peripheries or tips of the roller cutter discs 44 and designed by reference characters A, B, C, D, E, F, and G in FIGURE 7. The scraper bits 50 and lobes 55 thereof thus serve to clear the loose material in front of the roller cutter discs 44 as well as to break down and cut hard inclusions in the tunnel face in advance of the roller cutter discs 44.

In FIGURE 6, the scraper bit 55 is shown as having a converging inclined forward face 56 converging from the tips or lobes 55 of the scraper bit toward the bit holder 51 and the bucket 15 on which the bit holder is mounted, to force the loose material in advance of the cutter bit into said bucket, as paths are cleared for the following roller cutter discs 44.

While one form in which the invention may be embodied has been shown and described herein, it should be understood that various variations and modifications in the present invention may be effected without departing from the spirit and scope of the novel concepts thereof as defined by the claims appended hereto.

The invention is claimed as follows:

1. In a rotary boring head for tunneling machines and the like,
a support plate mounted for rotation about a horizontal axis,
a plurality of roller cutter disks mounted on said plate and spaced radially from the center thereof and circumferentially with respect to each other,
the improvement which comprises a plurality of cutter bits leading certain of said roller cutter disks and in alignment therewith and spaced backwardly of said roller cutter disks toward said plate at a lesser cutting gauge than the cutting gauge of said roller cutter disks.

2. In a rotary boring head for tunneling machines and the like,
a support plate mounted for rotation about a horizontal axis,
a plurality of cutter disks mounted on said plate and spaced radially from the center thereof and circumferentially with respect to each other,
said cutter disks including roller cutter disks having peripheral cutting faces spaced axially of the face of said plate,
and cutter bits mounted on said plate and leading certain of said roller cutter disks,
the cutting tips of which bits are spaced from the face of said plate at a lesser distance than the spacing of the effective cutting surfaces of said roller cutter disks from said plate and in circumferential alignment therewith.

3. A rotary boring head in accordance with claim 2, in which bearing support blocks are provided for rotatably mounting said roller cutter disks on said plate and in which said bearing support blocks form shrouds for said roller cutter disks.

4. In a rotary boring head for tunneling machines and the like,
a support journalled for rotation about a horizontal axis and having a plane advance face,
a plurality of support blocks mounted on said support in a continuous spiral from the center to the periphery thereof,
a roller cutter disk freely rotatably mounted in each support block,
bit mounting means in advance of said support blocks and said roller cutter disks,
and cutter bits mounted in said bit mounting means and extending axially from the plane face of said support and having cutting tips spaced a lesser distance forwardly of the plane face of said support than the spacing of the cutting surfaces of said cutter disks forwardly of the face of said support.

5. In a rotary boring head for tunneling machines and the like,
   a support rotatable about a horizontal axis,
   a plurality of roller cutter disks mounted on said support in a continuous spiral leading from the center to the periphery of said support,
   and cutter bits mounted on said support and projecting therefrom in axial directions,
   each cutter bit leading a roller cutting disk and set at a lesser cutting gauge than the cutting gauge of the following roller cutter disk.

6. A rotary boring head in accordance with claim 5, in which a plurality of peripheral roller cutting disks are provided and arranged at varying angles with respect to the front face of said support to cut a round corner at the periphery of the tunnel face.

7. A rotary boring head in accordance with claim 6, in which scraper bits generally fan-shaped in front elevation are provided in advance of each of said peripheral roller cutter disks and in which the gauge of said scraper bits is less than the gauge of the following peripheral rollers.

8. In a rotary boring head for tunneling machines and the like,
   a support rotatable about a horizontal axis and having a front face,
   a plurality of roller cutter disks mounted on said support and extending forwardly from the front face thereof,
   peripheral roller cutter disks pitched at varying angles with respect to said front face, to cut rounded corners at the periphery of the tunnel face,
   and scraper bits mounted in advance of said peripheral roller cutter disks and extending outwardly from said front face distances less than the cutting gauge of said disks,
   each scraper bit having a plurality of cutting lobes thereon aligned with a roller cutter disk and conforming to the cutting paths of the associated roller cutter disks.

9. In a rotary boring head for tunneling machines and the like,
   a plate rotatable about a horizontal axis and having a plane front face,
   a plurality of circumferentially spaced peripheral roller cutter disks mounted on said plate and projecting forwardly therefrom and outwardly of the periphery thereof,
   a scraper bit mounted on said plate in advance of each roller cutter disk, and projecting from said plate at less than the cutting gauge of said roller cutter disks,
   each scraper bit having a plurality of cutting lobes thereon conforming in number and angular position to the cutting faces of the next succeeding roller cutter disks throughout the circumference of said plate.

10. In a rotary boring head for tunneling machines and the like,
    a support rotatable about a horizontal axis and having a plurality of boring arms projecting radially therefrom,
    a plurality of circumferentially spaced peripheral roller cutter disks mounted on said boring arms and projecting forwardly therefrom and outwardly of the periphery thereof,
    a scraper bit mounted on each boring arm in advance of associated roller cutter disks, and projecting from said boring arm at less than the cutting gauge of said roller cutter disks,
    each scraper bit having a plurality of cutting lobes thereon conforming in number and angular position to the cutting faces of the next succeeding roller cutter disks, and each scraper bit having inclined faces inclined inwardly from said lobes towards said boring arms, for progressing the cleared material towards the center of said boring head.

11. In a rotary boring head for tunneling machines and the like,
    a plate rotatable about a horizontal axis and having a plane front face,
    a plurality of boring arms extending radially from said plate having material collecting buckets extending in advance thereof and opening in the direction of rotation of said boring head,
    a plurality of roller cutter disks mounted on said plate from the center to the periphery thereof,
    peripheral roller cutter disks mounted on said boring arms and having cutting peripheries spaced radially outwardly of said arms and forwardly thereof and pitched at various angles with respect to said plate to cut a round corner at the periphery of the tunnel bore,
    scraper bits mounted in advance of said peripheral roller cutter disks generally conforming to the rounded corners of the tunnel bore for clearing paths in front of said peripheral roller disks,
    the tips of said scraper bits being spaced rearwardly of the cutting faces of said peripheral roller cutter disks, and said scraper bits having inclined under surfaces inclined from the tips of said bits towards said buckets for progressing the cleared material into said buckets.

References Cited in the file of this patent

UNITED STATES PATENTS

| | | |
|---|---|---|
| 17,650 | Wilson | June 23, 1857 |
| 1,326,480 | Dana | Dec. 30, 1919 |
| 2,769,614 | Zeni | Nov. 6, 1956 |